United States Patent
Kawabata et al.

(10) Patent No.: US 8,144,031 B2
(45) Date of Patent: Mar. 27, 2012

(54) PARKING ASSISTANCE DEVICE AND PARKING ASSISTANCE METHOD

(75) Inventors: Yukiko Kawabata, Toyota (JP); Yasushi Makino, Mishima (JP); Hideyuki Iwakiri, Tajimi (JP); Yuichi Kubota, Okazaki (JP); Tomohiko Endo, Toyota (JP); Miyuki Omori, Toyota (JP); Takuya Ito, Kuwana (JP); Atsuko Nakanishi, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/525,601

(22) PCT Filed: Feb. 12, 2008

(86) PCT No.: PCT/JP2008/052261
§ 371 (c)(1),
(2), (4) Date: Aug. 3, 2009

(87) PCT Pub. No.: WO2008/099809
PCT Pub. Date: Aug. 21, 2008

(65) Prior Publication Data
US 2010/0033348 A1 Feb. 11, 2010

(30) Foreign Application Priority Data
Feb. 15, 2007 (JP) ................... 2007-035457

(51) Int. Cl.
*G01C 21/00* (2006.01)
(52) U.S. Cl. ..................... 340/908; 340/454
(58) Field of Classification Search .......... 340/104, 340/932.2, 908, 454, 451; 701/36, 1; 303/3, 303/9.63
See application file for complete search history.

(56) References Cited

U.S. PATENT DOCUMENTS
2005/0264432 A1  12/2005  Tanaka et al.
2006/0069478 A1*  3/2006  Iwama ..................... 701/36

FOREIGN PATENT DOCUMENTS
| JP | 10 264840 | 10/1998 |
| JP | 2001 334899 | 12/2001 |
| JP | 2003 81041 | 3/2003 |
| JP | 2003 127813 | 5/2003 |
| JP | 2004 99015 | 4/2004 |
| JP | 2004 306814 | 11/2004 |

(Continued)

OTHER PUBLICATIONS

U.S. Appl. No. 12/293,559, filed Sep. 19, 2008, Kawabata, et al.
U.S. Appl. No. 12/298,037, filed Oct. 22, 2008, Kawabata, et al.
U.S. Appl. No. 12/525,732, filed Aug. 4, 2009, Kawabata, et al.

(Continued)

*Primary Examiner* — Shirley Lu
(74) *Attorney, Agent, or Firm* — Oblon, Spivak, McClelland, Maier & Neustadt, L.L.P.

(57) ABSTRACT

A parking assisting device includes an ambient area detecting unit that detects an obstacle or a parking frame in an ambient area surrounding a vehicle, and a guiding unit guides the vehicle to a parking initial position from which parking of the vehicle to a parking space, adjacent to the detected obstacle, or the detected parking frame is permissible. In the parking assisting device, a guidance mode in which the guiding unit guides the vehicle to the parking initial position is set up based on a distance between the vehicle and the detected obstacle or the detected parking frame in a vehicle width direction of the vehicle.

9 Claims, 11 Drawing Sheets

FOREIGN PATENT DOCUMENTS

| | | |
|---|---|---|
| JP | 2005 313710 | 11/2005 |
| JP | 2006 290051 | 10/2006 |
| JP | 2006 312440 | 11/2006 |
| KR | 10-2006-0017037 A | 2/2006 |

OTHER PUBLICATIONS

Office Action issued Jul. 14, 2011 in Korean Patent Application No. 10-2009-7016869 (with English translation).

* cited by examiner

PARKING ASSISTANCE DEVICE AND PARKING ASSISTANCE METHOD

TECHNICAL FIELD

This invention relates to a parking assisting device and a parking assisting method which are adapted to assist parking of a vehicle.

BACKGROUND ART

A conventional parking assisting device which assists parking of a vehicle in a parking space is known. The conventional parking assisting device includes a detection unit to detect a parking space, a storage unit to store information of the detected parking space, a parking assisting operation starting unit to start a parking assisting operation, and a control unit. The control unit always performs detection of the parking space. When the parking assisting operation starting unit is set in an ON state, the control unit performs the parking assisting operation that is required to guide the vehicle to the parking space. Refer to Patent Document 1. Patent Document 1: Japanese Laid-Open Patent Publication No. 2003-081041

DISCLOSURE OF THE INVENTION

The Problem to be Solved by the Invention

When a given operation to the parking assisting operation starting unit is performed, the conventional parking assisting device starts performing the parking assisting operation using the results of detection of the parking space. However, it is necessary to positively guide the vehicle to a parking initial position that allows the vehicle to be guided to the detected parking space appropriately. Depending on the position where the parking assisting operation is started, the vehicle may not be appropriately guided from that position to the parking space.

In one aspect of the invention, the present disclosure provides a parking assisting device and a parking assisting method which are able to appropriately guide the vehicle to a parking initial position from which parking of the vehicle to a target parking position is permissible.

Means for Solving the Problem

In a first aspect of the invention which solves or reduces one or more of the above-mentioned problems, the present disclosure provides a parking assisting device comprising: an ambient area detecting unit that detects an obstacle or a parking frame in an ambient area surrounding a vehicle; and a guiding unit that guides the vehicle to a parking initial position from which parking of the vehicle to a parking space, adjacent to the detected obstacle, or the detected parking frame is permissible, wherein a guidance mode in which the guiding unit guides the vehicle to the parking initial position is set up based on a distance between the vehicle and the detected obstacle or the detected parking frame in a vehicle width direction of the vehicle.

In a second aspect of the invention, the parking assisting device of the first aspect of the invention is arranged so that the guiding unit includes a message unit that informs the parking initial position to a vehicle operator in an audiovisual manner, and a start timing of the information by the message unit is adjustable according to the distance.

In a third aspect of the invention, the parking assisting device of the second aspect of the invention is arranged so that a first start timing of the information by the message unit set when the distance is equal to a first value is earlier than a second start timing of the information by the message unit set when the distance is equal to a second value, if the first value is smaller than the second value.

In a fourth aspect of the invention, the parking assisting device of the first aspect of the invention is arranged so that the guiding unit includes an automatic running unit that allows the vehicle to automatically run to the parking initial position, and a start timing of the automatic running by the automatic running unit is adjustable according to the distance.

In a fifth aspect of the invention, the parking assisting device of the fourth aspect of the invention is arranged so that a first start timing of the automatic running by the automatic running unit set when the distance is equal to a first value is earlier than a second start timing of the automatic running by the automatic running unit set when the distance is equal to a second value, if the first value is smaller than the second value.

Furthermore, in a sixth aspect of the invention which solves or reduces one or more of the above-mentioned problems, the present disclosure provides a parking assisting method comprising: detecting an obstacle or a parking frame in an ambient area surrounding a vehicle; determining a target parking position of the vehicle based on the detected obstacle or the detected parking frame; determining a parking initial position from which parking of the vehicle to the determined target parking position is permissible, based on a distance between the vehicle and the detected obstacle or the detected parking frame in a vehicle width direction of the vehicle; and setting a guidance mode in which the vehicle is guided to the parking initial position, based on the determined parking initial position.

In a seventh aspect of the invention, the parking assisting method of the sixth aspect of the invention is arranged so that the setting includes setting a start timing at which guiding of the vehicle to the parking initial position is started.

EFFECTS OF THE INVENTION

According to the embodiments of the invention, it is possible to appropriately guide the vehicle to the parking initial position from which parking of the vehicle to the target parking position is permissible.

DESCRIPTION OF REFERENCE NUMERALS

Figure 1:
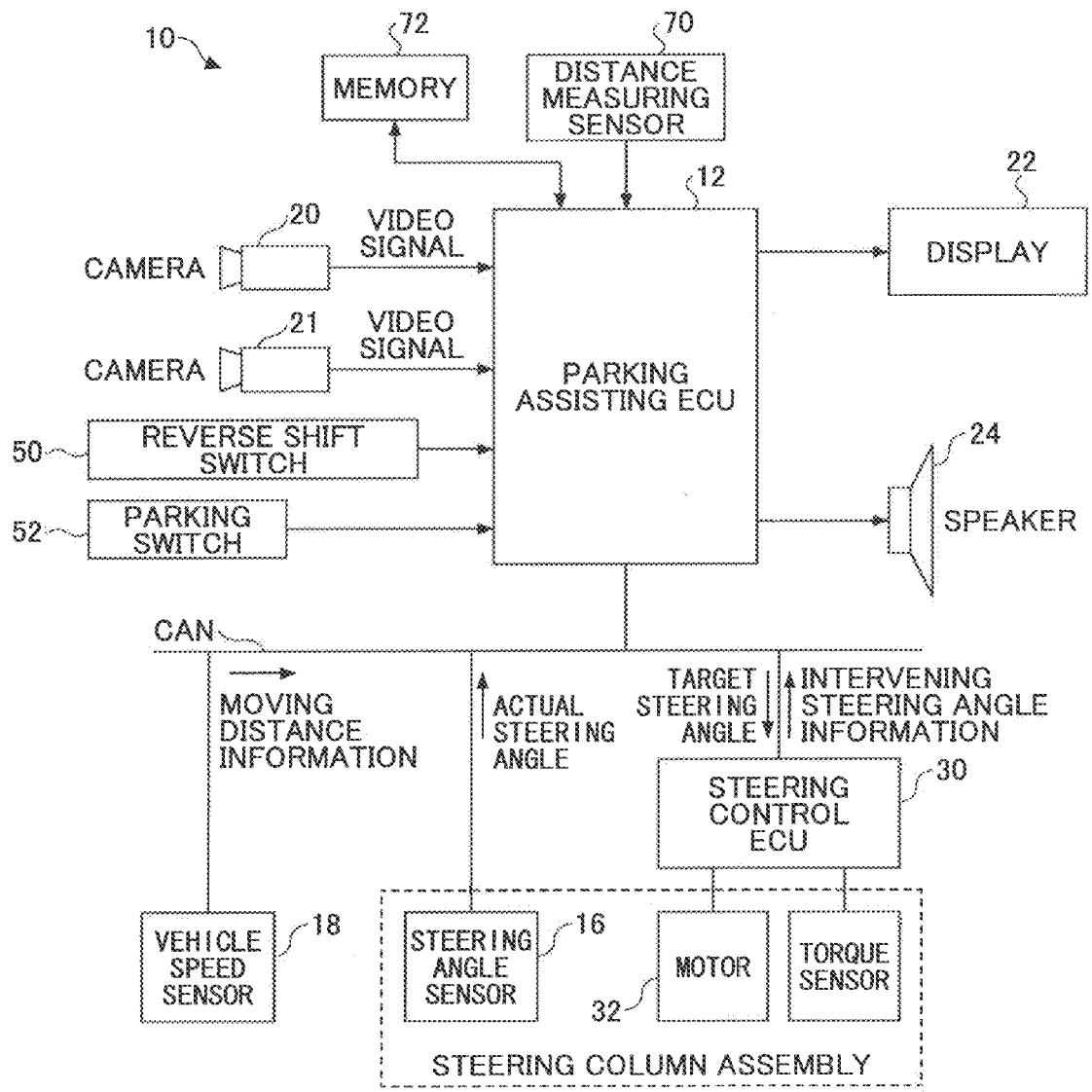
FIG. 1 is a block diagram illustrating the composition of a parking assisting device 10 of an embodiment of the invention.

10 parking assisting device
12 parking assisting ECU
16 steering angle sensor
18 vehicle speed sensor
20 back monitor camera
21 front monitor camera
22 display
24 speaker
30 steering control ECU
42 obstacle information generating part
44 parking frame information generating part
46 target parking position determining part
48 parking initial position computing part
49 information output control part
50 reverse shift switch
52 parking switch
70 distance measuring sensor

BEST MODE FOR CARRYING OUT THE INVENTION

A description will be given of the embodiments of the invention with reference to the accompanying drawings.

FIG. 1 is a block diagram illustrating the composition of a parking assisting device 10 of an embodiment of the invention. As illustrated in FIG. 1, the parking assisting device 10 is mainly constituted by an electronic control unit (ECU) 12. This ECU 12 will be called parking assisting ECU 12.

The parking assisting ECU 12 is a microcomputer which includes a CPU, a ROM, a RAM, etc., and these components are interconnected by a bus (which is not illustrated). In the ROM, data and a program which, when executed by the CPU, causes the CPU to perform a parking assisting method of an embodiment of the invention, are stored.

A steering angle sensor 16 and a vehicle speed sensor 18 are connected to the parking assisting ECU 12 through a suitable bus, such as a CAN (controller area network) bus, a high speed communication bus, etc. The steering angle sensor 16 detects a steering angle of a steering wheel (not illustrated). The vehicle speed sensor 18 detects a speed of the vehicle. The vehicle speed sensor 18 may be a wheel speed sensor which is disposed in each of the vehicle wheels to output a pulse signal at intervals of a period proportional to the vehicle wheel speed.

As illustrated in FIG. 1, a back monitor camera 20 and a front monitor camera 21 are connected to the parking assisting ECU 12. The back monitor camera 20 is disposed in the rear part of the vehicle to take an image of the scenery in a specified angle area behind the vehicle. The front monitor camera 21 is disposed in the front part of the vehicle to take an image of the scenery in a specified angle area ahead of the vehicle.

The range in which the back monitor camera 20 can take an image of the scenery is at least a vehicle-rear range which extends slantingly at a specified angle to the vehicle width direction. The range in which the front monitor camera 21 can take an image of the scenery is at least a vehicle-front range which extends slantingly at a specified angle to the vehicle width direction. Each of the back monitor camera 20 and the front monitor camera 21 may be a camera including an imaging element, such as CCD, CMOS, etc.

A reverse shift switch 50 and a parking switch 52 are connected to the parking assisting ECU 12. The reverse shift switch 50 outputs an ON signal when the gearshift is operated in a reverse position, and otherwise the output signal of the reverse shift switch 50 is kept in an OFF state. The parking switch 52 is disposed in the passenger compartment of the vehicle so that the parking switch 52 can be operated by the vehicle operator. The parking switch 52 is kept in an OFF state in the normal condition, and is set in an ON state by operation of the vehicle operator.

The parking assisting ECU 12 determines whether the vehicle operator needs a parking assisting operation, based on the output signal of the parking switch 52. Specifically, when the parking switch 52 is turned ON during running of the vehicle, the parking assisting ECU 12 starts parking assisting control for assisting the vehicle running to a target parking position in a parking space as soon as possible. This parking assisting control includes vehicle control, such as steering control, when the vehicle runs to a target parking position, and includes outputting of information to the vehicle operator, such as outputting of a guidance message for guiding the vehicle to a parking starting position, and steering assistance for assisting the vehicle operator to appropriately move the vehicle to a parking starting position.

A distance measuring sensor 70 is connected to the parking assisting ECU 12. The distance measuring sensor 70 detects a distance of the self-vehicle to a parked vehicle using any of an acoustic wave (for example, ultrasonic wave), an electric wave (for example, millimeter wave), a light wave (for example, laser beam), etc. The distance measuring sensor 70 may be a sensor that can detect a distance, such as a stereo vision sensor, a laser radar, a millimeter wave radar, an ultrasonic radar, etc. The distance measuring sensor 70 is disposed on each of the right and left sides of the front part of the vehicle.

Figure 2:
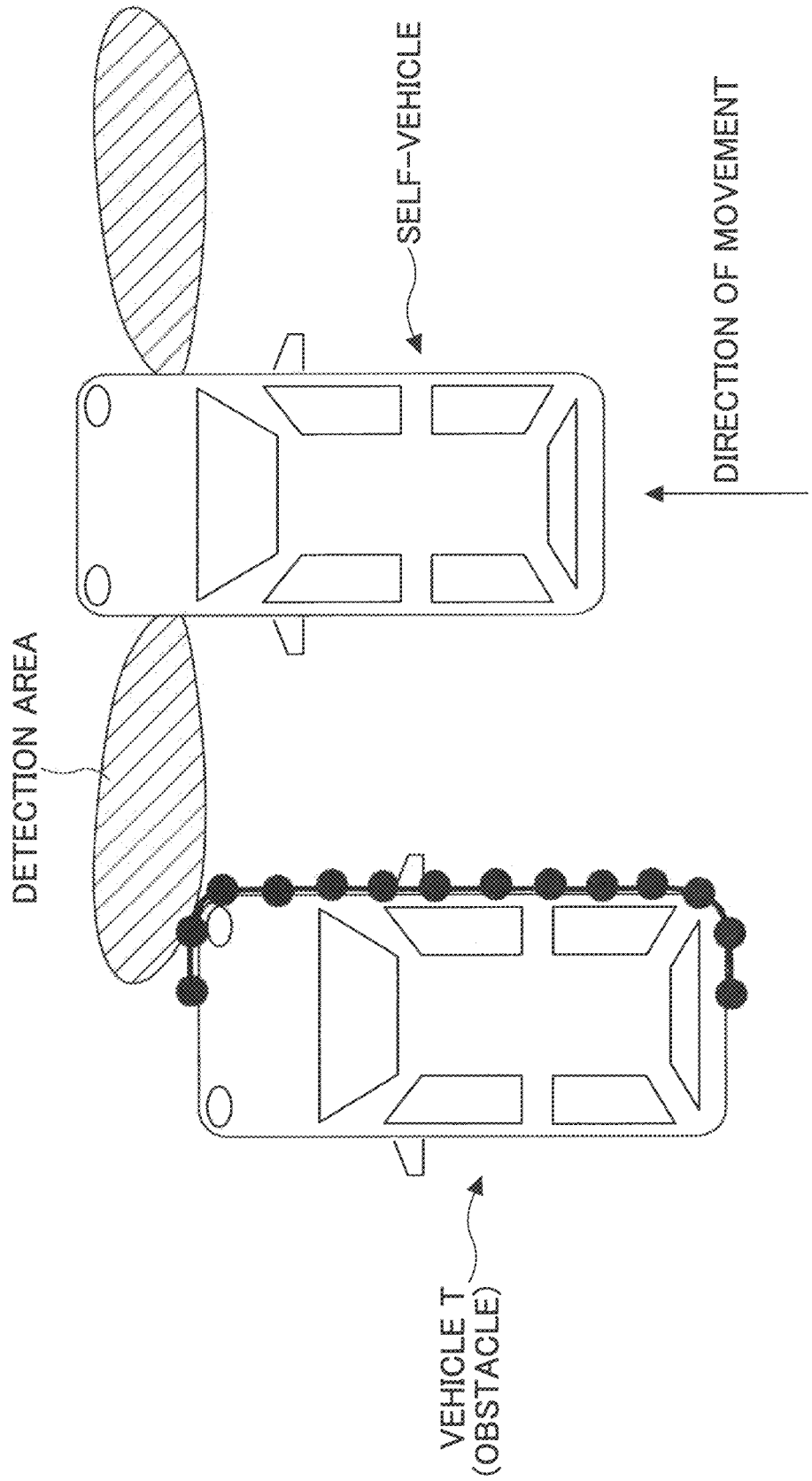
FIG. 2 is a diagram for explaining the way an object (in this example, a parked vehicle T) is detected by a distance measuring sensor 70.

As illustrated in FIG. 2, the distance measuring sensor 70 emits distance-measuring waves, such as acoustic waves, in predetermined directions which are centered on the vehicle width direction, and receives the reflected waves to detect a distance of the vehicle to an obstacle (or a parked vehicle) existing on the side of the vehicle. The distance measuring sensor 70 is disposed in the front part or the side part of the vehicle. The distance measuring sensor 70 is arranged to emit distance-measuring waves in forward slanting directions at specified angles to the vehicle width direction. For example, the distance measuring sensor 70 may be arranged near the bumper in the front part of the vehicle, so that the distance measuring sensor 70 emits acoustic waves in the forward slanting directions at the specified angles of 17 to 20 degrees to the vehicle width direction. The distance measuring sensor 70 may be arranged such that the emitting direction thereof is adjustable by changing the specified angles.

Figure 3:
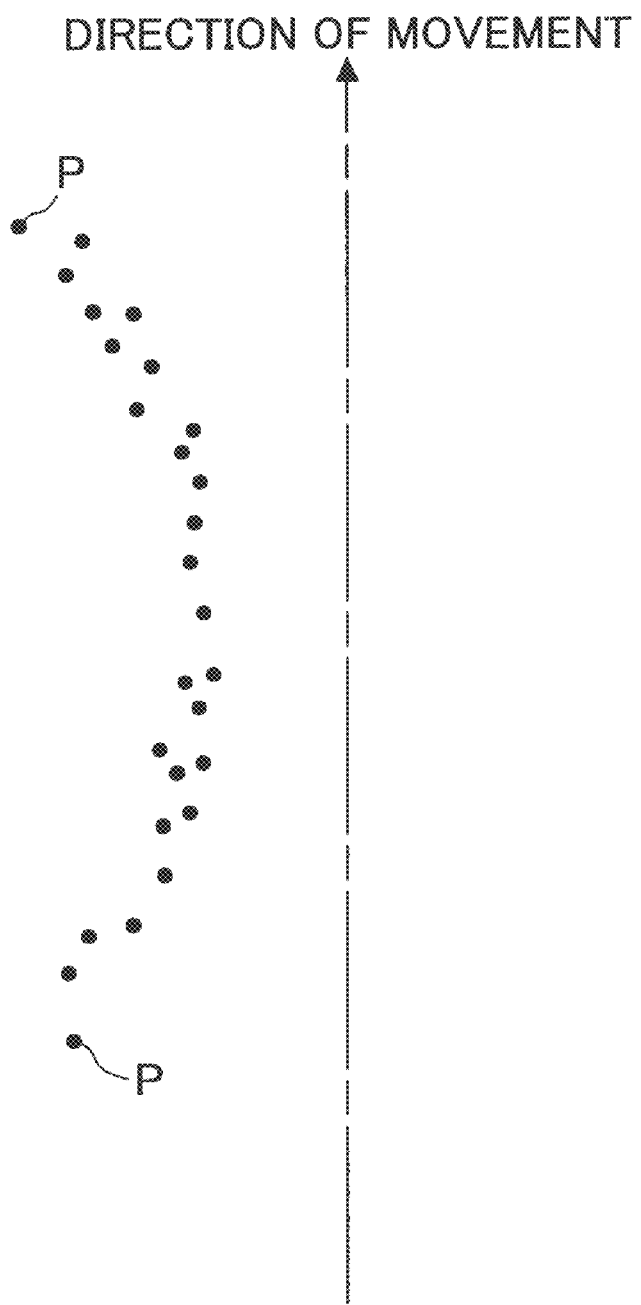
FIG. 3 is a diagram illustrating a sequence of points of a parked vehicle T obtained when a vehicle including a distance measuring sensor 70 (self-vehicle) runs near the parked vehicle T.

FIG. 3 is a diagram illustrating a sequence of points of a parked vehicle T obtained when the vehicle including the distance measuring sensor 70 (which vehicle will be called the self-vehicle) has passed by the obstacle (the parked vehicle T) as illustrated in FIG. 2. As illustrated in FIG. 3, the distance measuring sensor 70 outputs a sequence of points which indicates a set of reflection points of the obstacle (or a set of reflection points of the acoustic waves). The output data from the distance measuring sensor 70 may be stored into a memory 72 (for example, an EEPROM) of the parking assisting device 10 at any time for every output cycle.

Figure 4:
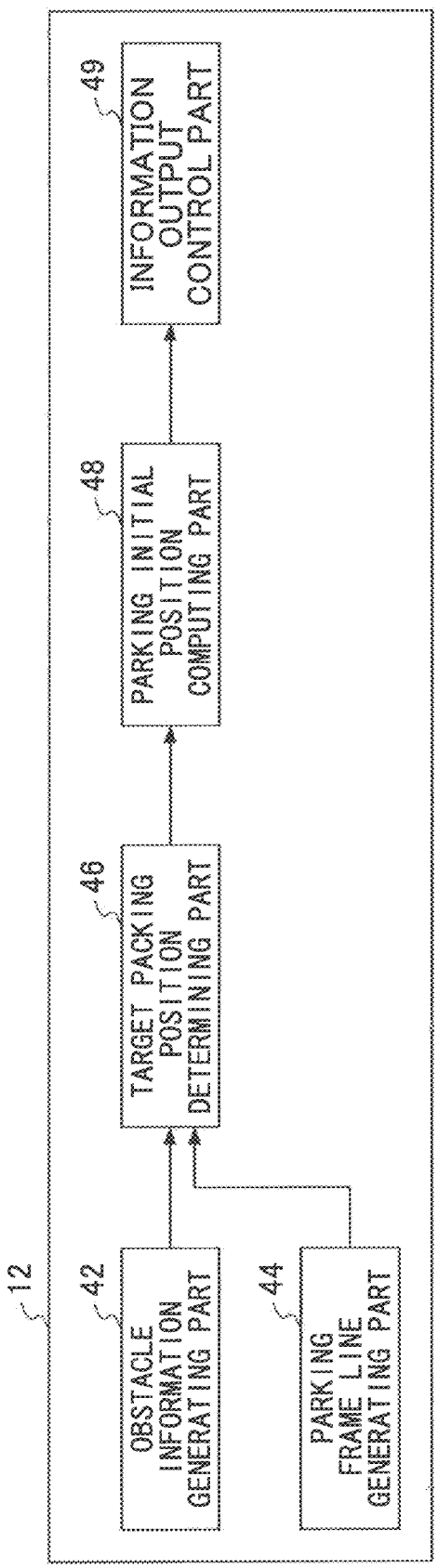
FIG. 4 is a block diagram illustrating the functional composition of a parking assisting ECU 12 of an embodiment of the invention.

FIG. 4 is a block diagram illustrating the functional composition of a parking assisting ECU 12 of an embodiment of the invention. The parking assisting ECU 12 includes an obstacle information generating part 42, a parking frame information generating part 44, a target parking position determining part 46, a parking initial position computing part 48, and an information output control part 49. A description will be given of the functional composition of the respective parts of the parking assisting ECU 12.

The obstacle information generating part 42 generates obstacle information which represents an obstacle adjacent to a parking space.

In a case of parallel parking, the obstacle information generating part 42 (which may be a parking space detecting part (not illustrated) which is different from the obstacle information generating part 42) recognizes existence of the parking space in two steps based on the results of the detection (which are the data of the sequence of points indicating the distance of the self-vehicle to the side part of the parked vehicle) by the distance measuring sensor 70. It is assumed that the vehicle (self-vehicle) passes by the side of the parked vehicle (and the parking space adjacent to the parked vehicle) in the direction of movement indicated by the arrow in FIG. 3. In the following, the terms "far side" and "near side" are used by making reference to the direction of movement of the vehicle (the self-vehicle).

Specifically, for example, when a length of the sequence of points is equal to or larger than a predetermined reference length Lb (for example, 2.0 m), the obstacle information generating part 42 sets a provisional flag to 1, which means that the obstacle has been detected provisionally. When a sequence of points whose length is equal to or larger than the predetermined reference length Lb is detected and thereafter a sequence of points is no longer detected for an area whose length is equal to or larger than a predetermined reference length Lc (for example, 50 cm), the obstacle information generating part 42 sets a completion flag to 1, which means that the detection of the obstacle has been completed.

When a sequence of points appears from a condition in which no sequence of points is detected for an area whose length is equal to or larger than a predetermined length L2 and then the provisional flag is set to 1, the obstacle information generating part 42 determines that a parking space exists on the side of the self-vehicle, and sets a parking space validity flag to 1. That is, when a sequence of points is not detected over the predetermined length L2 and thereafter a sequence of points whose length is equal to or larger than 2.0 m is detected, the obstacle information generating part 42 determines that a parking space exists on the near side of the obstacle detected by setting the provisional flag, and sets a parking space validity flag to 1. The predetermined length L2 is a minimum vacancy width (effective space width) needed for a parking space in the case of parallel parking. In this example, the predetermined length L2 is considered as being the sum of "front safety margin length lformargin" and "minimum parking lot length lmin", which will be mentioned later. The value of the predetermined length L2 should be determined depending on the overall length of the self-vehicle (for example, L2=6 m).

When a sequence of points is not detected for an area whose length is equal to or larger than a predetermined length (for example, L2−0.5 m) after the completion flag is set to 1, the obstacle information generating part 42 determines that a parking space exists on the side of the self-vehicle, and sets the parking space validity flag to 1. In this example, when a sequence of points whose length exceeds a predetermined length (>2.0 m) is detected and thereafter no sequence of points is detected for an area whose length is equal to or larger than the predetermined length L2, the obstacle information generating part 42 determines that a parking space exists on the far side of the obstacle detected by setting the completion flag, and sets the parking space validity flag to 1.

The obstacle information generating part 42 generates an end position information of an obstacle based on the sequence-of-points data indicating the end position of the obstacle adjacent to the parking space. Specifically, the obstacle information generating part 42 generates the end position information indicating the end position of the obstacle, considering an end point P (refer to FIG. 3) among the sequence of points of the obstacle in a reference direction as an end point of the obstacle. The reference direction mentioned above may be parallel (in the case of parallel parking) or perpendicular (in the case of vehicle warehousing parking) to the normal parking direction.

The obstacle information generating part 42 may be arranged to perform straight line approximation and/or curvilinear approximation to the sequence of points of the detected obstacle or to the sequence of points whose length exceeds the predetermined length, so that the obstacle information with a high level of accuracy is generated. Generally, the front part of a vehicle can be approximated with a secondary curve, and the side part of a vehicle can be approximated with a straight line or a secondary curve with a small radius of curvature. For this reason, the above-mentioned approximation may be performed with both or either of straight line approximation and curvilinear approximation using a secondary curve.

Figure 5:
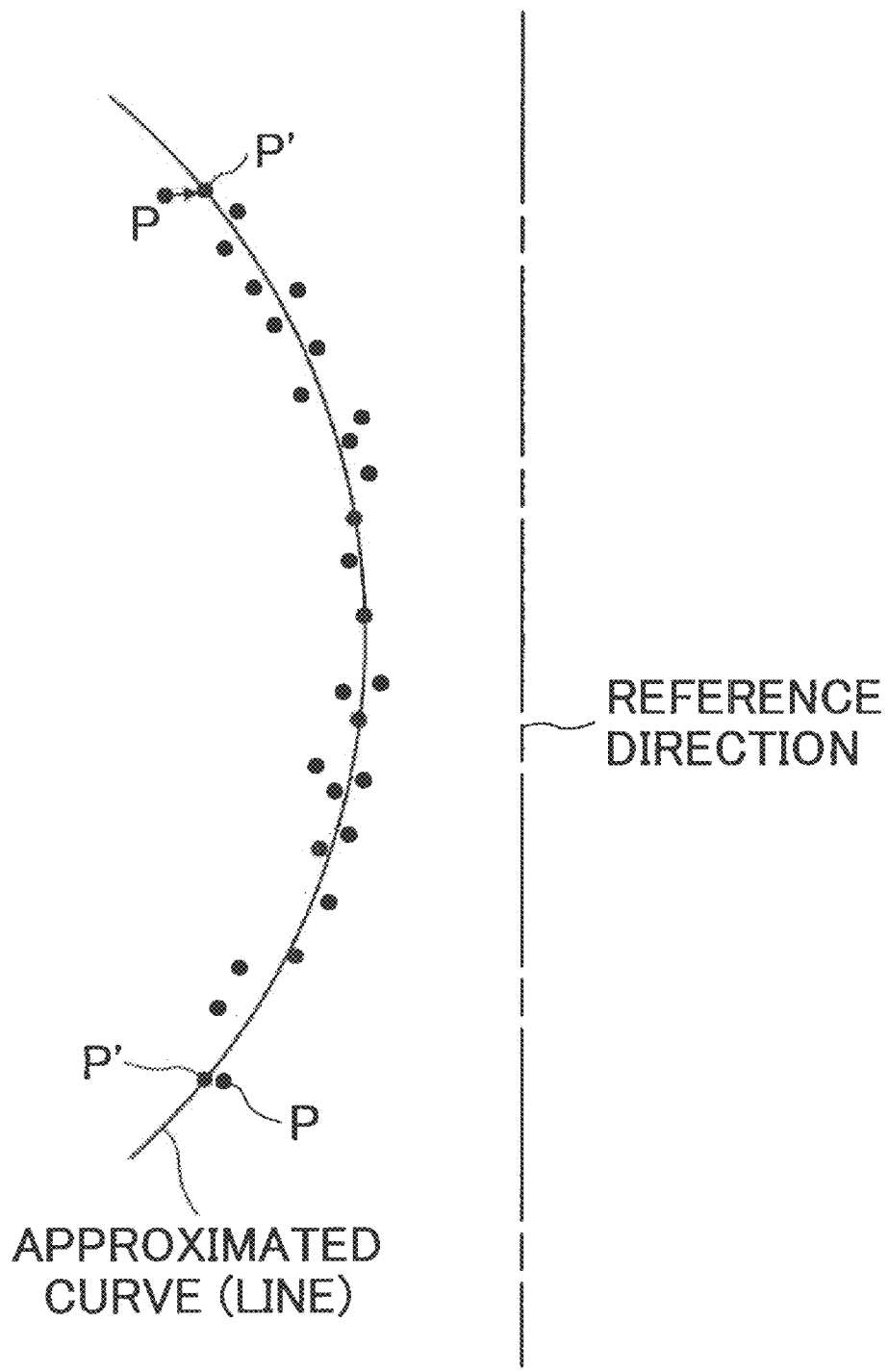
FIG. 5 is a diagram for explaining a method of correcting an end point.

For example, the end point P among the sequence of points (used for the approximation) in the reference direction is transferred to the point P' on the approximated curve or the approximation straight line as illustrated in FIG. 5 (the point P' is a projection of the point P on the approximated curve in the direction perpendicular to the reference direction) and the point P' is considered as the end point of the obstacle, so that the obstacle information generating part 42 generates the end position information of the obstacle.

In this embodiment, the end point in the reference direction is simply considered as the end point of the obstacle. When the obstacle is a parked vehicle, a point among the sequence of points nearest to the target running direction or an end point in a direction along the side face of the parked vehicle may be defined as the end point of the parked vehicle.

The obstacle information generating part 42 may be arranged to generate the obstacle information on real time based on the output data from the distance measuring sensor 70. Alternatively, the obstacle information generating part 42 may be arranged so that, when a target parking position is determined, the obstacle information generating part 42 reads from the memory 72 the output data of the distance measuring sensor 70 and generates the obstacle information based on the output data read from the memory 72. As for a parking space interposed between two obstacles, the obstacle information generating part 42 may generate obstacle information for each of the two obstacles.

The parking frame information generating part 44 performs a parking frame line recognition process to the captured image from the back monitor camera 20 or the front monitor camera 21, and generates parking frame line information as a result of the parking frame line recognition process. The image recognition process of a parking frame line may be performed appropriately by using any of various known methods.

Figure 6:
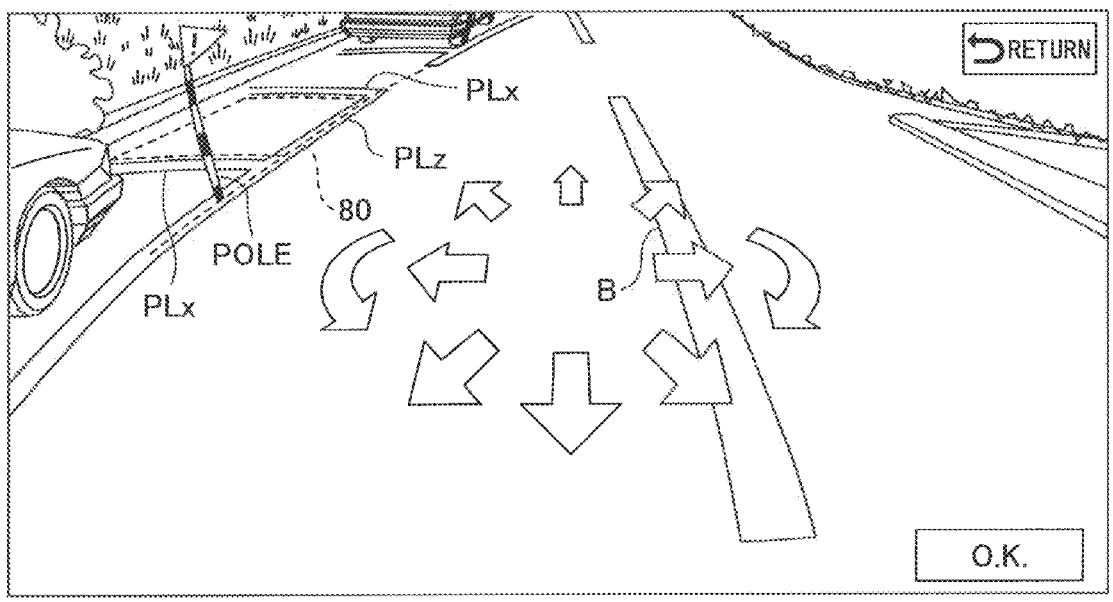
FIG. 6 is a diagram illustrating an example of a touch panel for setting up a target parking position on a display 22.

A description will be given of an example of the image recognition process of the parking frame line. In this example, characteristic points within an area of interest are first extracted. Each characteristic point is extracted as a luminance change point where a luminance change exceeding a predetermined threshold occurs. Namely, the outline (edge) of an image at which a rapid change in brightness occurs is extracted. Subsequently, the data of the respective pixels of the image are transformed from the camera coordinate system into the actual coordinate system through distortion compensation. Subsequently, a straight line substitution for the outline (or the sequence of characteristic points) is performed (straight line approximation) so that a characteristic point outline is determined. Subsequently, a pair of two outlines which are parallel to each other is detected as lateral lines PLx (refer to FIG. 6) of parking frame lines (typically, white lines). Moreover, a pair of two outlines which pass through the ends of the parallel outlines of the previously detected pair and are perpendicular to the parallel outlines of the previously detected pair is detected as longitudinal lines PLz (refer to FIG. 6) of the parking frame line.

The parking frame information generating part 44 generates a parking frame line information that indicates the positions of the thus detected parking frame lines. The positions of the parking frame lines may be the two end points of the lateral lines PLx of the parking frame lines on the side of the self-vehicle (or the ends of the parking space on the entrance side).

Because the camera (the front monitor camera 21) provided in the parking frame information generating part 44 is capable of capturing the image of the scenery up to the vehicle side, the parking frame information generating part 44 generates the parking frame line information when the parking space is detected or when the parking initial position which will be described below is reached.

In this case, the parking frame information generating part 44 may generate the parking frame line information on real time based on the captured image of the front monitor camera 21. Alternatively, the parking frame information generating part 44 may generate the parking frame line information based on the output image data (or the results of the parking frame line recognition process) of the front monitor camera 21 read from the memory 72 when the target parking position is determined.

Alternatively, the parking frame information generating part 44 may generate again the parking frame line information based on the image of the back monitor camera 20 at the parking initial position which is a vehicle position where the image of the parking frame line is captured by the back monitor camera 20.

The target parking position determining part 46 determines a target parking position appropriately. For example, this target parking position may be determined by the position of the center of the vehicle rear axle at the time of the completion of parking. Any of various methods may be used as the method of determining a target parking position appropriately.

For example, the target parking position determining part 46 may determine a target parking position based on the output data of the distance measuring sensor 70. In this case, the target parking position determining part 46 may determine a target parking position by a point in a predetermined positional relationship relative to the end position (end point) of the obstacle on the side of the vehicle. For example, the end position of the obstacle on the side of the vehicle may be the end position of an obstacle corresponding to a sequence of points with a length larger than a predetermined length L (for example, 2.0 m) which is detected after a sequence of points has not been detected over the predetermined length L. That is, it may be considered as the end position of the obstacle corresponding to the above-described provisional flag when it is determined that the parking space exists on the near side of the obstacle.

Alternatively, the end position of the obstacle on the side of the vehicle may be the end position of an obstacle corresponding to a sequence of points which is not detected for a length larger than a predetermined length L (for example, 2.0 m) after a sequence of points over the predetermined length L has been detected. That is, it may be considered as the end position of the obstacle corresponding to the above-described provisional flag when it is determined that the parking space exists on the far side of the obstacle. At this time, the angle relationship between the target parking position and the end position of the obstacle may be determined based on the direction of the vehicle, the configuration of the obstacle (the results of the approximation), or the straight line connecting the end points of two obstacles.

When a parking space between two obstacles is detected (for example, when a region in which any sequence of points with a length larger than a predetermined length does not exist between the end points of the sequences of points indicating the two obstacles is detected), the target parking position may be determined by a suitable point between the respective end points of the two obstacles. In that case, the angle relationship between the target parking position and the end positions of the obstacles may be determined based on the direction of the vehicle, the configuration of the obstacles (the results of the approximation), or the straight line connecting the end points of the two obstacles.

In the case of the determining method using the obstacle information generating part 42 (using the output data of the distance measuring sensor 70), the target parking position can be determined in a comparatively early stage (in the stage in which the parking space is detected). Thus, it is possible to appropriately guide the vehicle to the parking initial position based on the determined target parking position.

For example, the target parking position determining part 46 may determine a target parking position based on the result of the parking frame line recognition process using the captured image of the front monitor camera 21 (or side camera). In this case, the target parking position determining part 46 may determine a target parking position by a point in a predetermined positional relationship relative to the end position (end point) of the lateral line PLx of the parking frame line on the side of the vehicle. At this time, the angle relationship between the target parking position and the end position of the lateral line PLx may be determined based on the direction of the parking frame line.

Alternatively, a target parking position may be determined based on the results of the recognition process of an obstacle in the captured image. In the case of the determining method using the parking frame information generating part 44 (using the captured image of the front monitor camera 21), the target parking position can be determined in a comparatively early stage (in the stage in which the parking space is detected) based on the determined target parking position. Thus, it is possible to appropriately guide the vehicle to the parking initial position.

Figure 7:
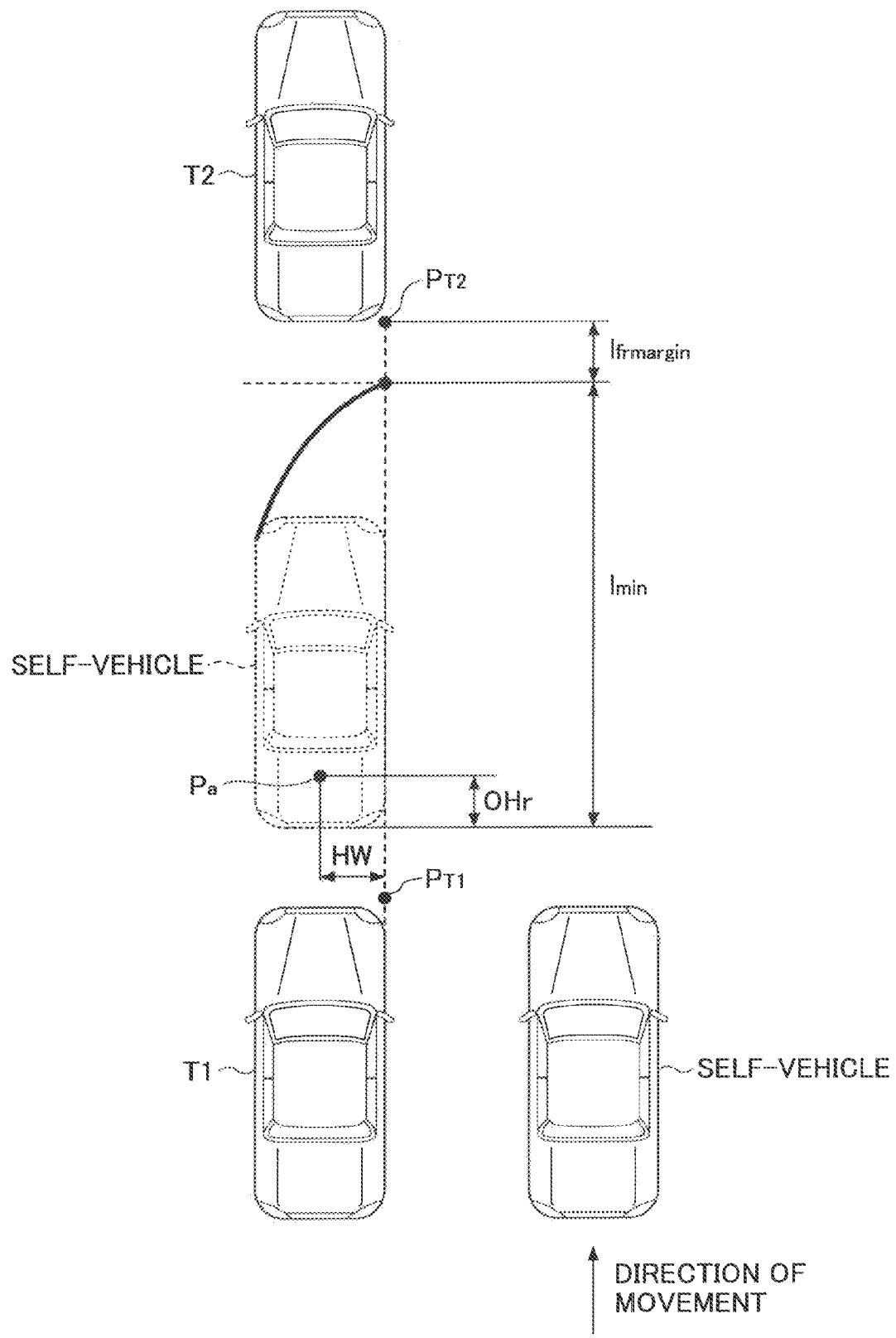
FIG. 7 is a diagram for explaining a method of determining a target parking position.

FIG. 7 is a diagram for explaining a method of determining a target parking position. For the sake of convenience, a direction parallel to the direction of movement of the self-vehicle (the normal parking direction) is defined as the direction Z, and a direction perpendicular to the normal parking direction is defined as the direction X.

The direction Z and the direction X may be recognized by the system (the parking assisting ECU 12) based on the direction of the vehicle, the direction of an obstacle, the direction of a recognized parking frame line, etc. A target parking position Pa is defined by the position of the center of the rear wheel axle of the self-vehicle at the time of the completion of parking.

The target parking position Pa is determined by the position of a point PT2 in a predetermined positional relationship relative to an end point of the rear part of a parked vehicle T2 which is an obstacle on the side of the self-vehicle (or the end point of the lateral line PLx of the parking frame line on the side of the self-vehicle).

Specifically, as illustrated in FIG. 7, the position in the direction Z of the target parking position Pa is determined by the position which is distant from the end point PT2 by a displacement of "front safety margin length lformargin"+ "minimum parking lot length lmin"−"rear overhang OHr" in the direction opposite to the direction of movement of the self-vehicle. And the position in the direction X of the target parking position Pa is determined by the position which is distant from the end point PT2 by a displacement of "length HW of the half of the self-vehicle width" in the direction toward the parking space side.

Assuming that L denotes the overall length of the self-vehicle, OHr denotes the rear overhang (a length from the self-vehicle rear wheel axle to the self-vehicle rear end), and γmax denotes the maximum turning curvature of the self-vehicle, the minimum parking lot length lmin is represented by the formulas:

$$lmin = \sqrt{(L-OHr)^2 + (Rmin+HW)^2 - (Rmin-HW)^2} + OHr,$$

$$Rmin = 1/\gamma max$$

in accordance with the Pythagorean theorem (where sqrt{*} expresses the square root of *).

Therefore, the target parking position determining part 46 uses the result of computation of the minimum parking lot length lmin computed based on the known vehicle information, such as the geometrical dimensions and the turning characteristics of the self-vehicle, and determines the coordinates of the target parking position Pa, relative to the end point PT2, which is generated by the obstacle information generating part 42 or the parking frame information generating part 44.

The parking initial position computing part 48 computes a parking initial position in which parking in the target parking position is permissible based on the target parking position which is determined as a parking completion position. This parking initial position is a parking starting position at which the running path to the target parking position in the parking space or parking frame line by the backward or forward movement can be generated.

Because the parking initial position in which parking to the target parking position is permissible is not a point but a range, the parking initial position determined by the parking initial position computing part 48 may be defined by a range of the permissible positions.

The running path along which the self-vehicle is guided to the target parking position is primarily determined based on the turning characteristics, such as the maximum turning curvature of the vehicle, and the running path may be expressed by a combination of a circular arc, a clothoid curve, a straight line, etc.

The parking initial position may be defined the position of an arbitrary part of the self-vehicle. For example, the parking initial position may be defined by either the position of the center of the vehicle front end part or the position of the center of the vehicle rear axle.

Figure 8:
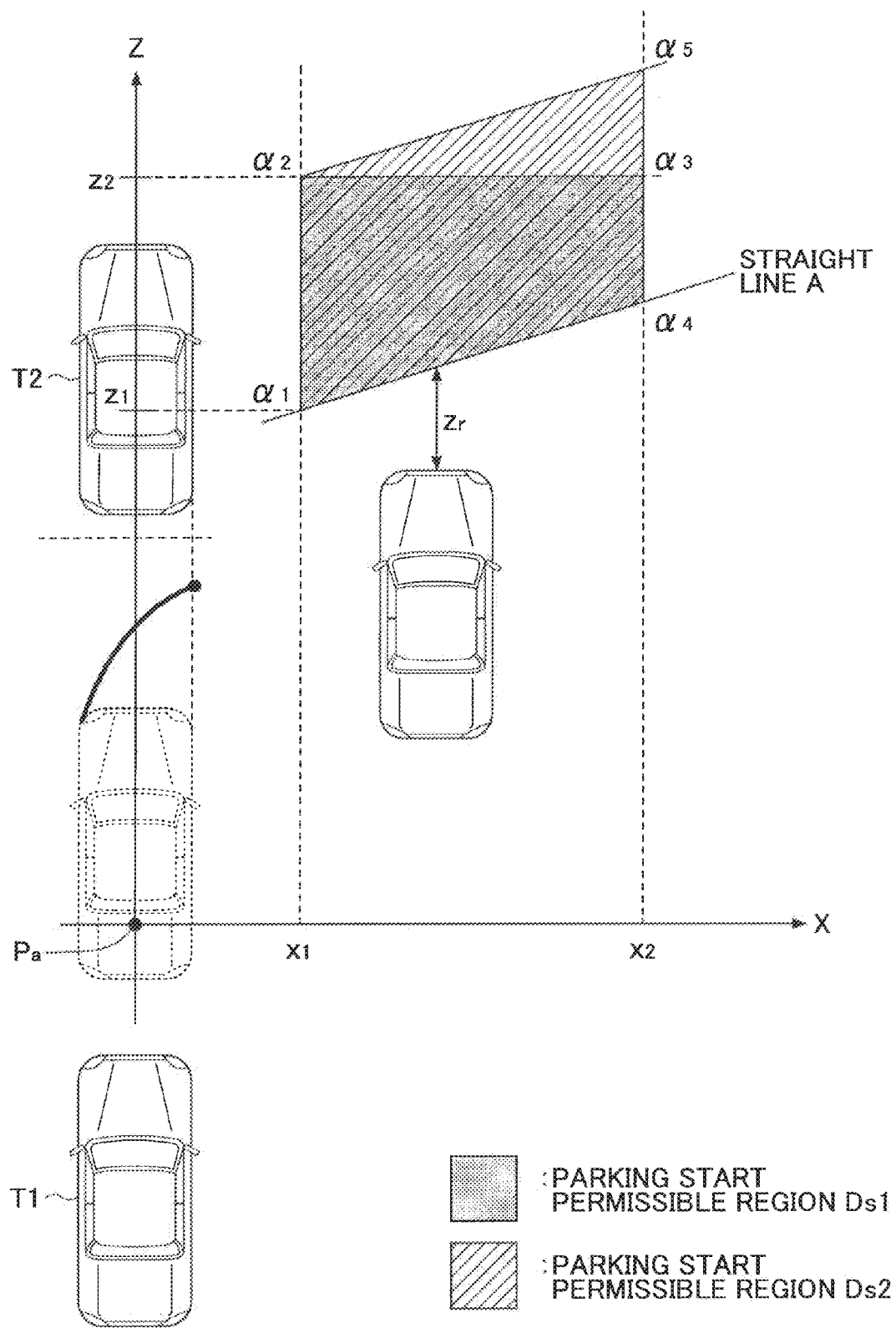
FIG. 8 is a diagram for explaining a parking initial position in parallel parking.

FIG. 8 is a diagram for explaining a parking initial position in a case of parallel parking. Generally, the parking initial position from which the running path of the vehicle to the target parking position Pa between the obstacle T1 and the obstacle T2 can be generated exists in a parking start permissible region Ds (Ds1 or Ds2) in the configuration as illustrated in FIG. 8.

The relative positional relationship between the target parking position Pa and the parking initial position from which parking of the self-vehicle to the target parking position Pa is permissible varies depending on the restrictions, including the capturing range of the back monitor camera 20, the geometrical dimensions and turning characteristics of the self-vehicle, and the consideration of the ambient environment of the self-vehicle.

The difference in the area between the parking start permissible regions Ds1 and Ds2 depends on whether the vehicle operator uses the captured image information from the back camera 20 in performing the backward parking of the vehicle from the parking initial position to the target parking position Pa. When the vehicle operator uses the captured image information from the back camera 20 (in performing the backward parking of the vehicle by manual operation by the vehicle operator), the vehicle operator cannot perform resetting or confirming of the target parking position Pa, if the target parking position Pa does not exist within the image capturing range of the back camera 20. Therefore, because of the restriction of the image capturing range of the back camera 20, the parking start permissible region Ds in this case is set to the parking start permissible region Ds1 which is defined by the boundary line ($\alpha 2$-$\alpha 3$). Namely, when the position of the self-vehicle in the direction Z exceeds the boundary line ($\alpha 2$-$\alpha 3$), the back camera 20 cannot capture the image of the target parking position Pa.

On the other hand, when the vehicle operator does not use the image information from the back camera 20 (in performing the backward parking of the vehicle by the automatic operation using the system (the parking assisting ECU 12)), it is not necessary that the target parking position Pa exists within the image capturing range of the back camera 20. Therefore, because the restriction of the image capturing range of the back camera 20 is eased or eliminated, the parking start permissible region Ds in this case is set to the parking start permissible region Ds2 which is defined by the boundary line ($\alpha 2$-$\alpha 5$), the area of the region Ds2 being larger in the direction Z than that of the parking start permissible region Ds1.

In the case of parallel parking, the running path of the self-vehicle to the target parking position Pa is restricted by the above restrictions as the position of the self-vehicle in the vehicle width direction of the self-vehicle is becoming close to the obstacles T1 and T2 and the target parking position Pa. The boundary line ($\alpha 1$-$\alpha 2$) in the direction X of the parking start permissible region Ds1 or Ds2 is located in the position which is distant from the target parking position Pa in the direction X by a predetermined distance x1, the predetermined distance x1 being determined by the above restriction.

Moreover, the running path of the self-vehicle to the target parking position Pa is restricted by the above restrictions as the position of the self-vehicle in the vehicle width direction of the self-vehicle is becoming far from the obstacles T1 and T2 and the target parking position Pa. The boundary line ($\alpha 3$-$\alpha 4$) in the direction X of the parking start permissible region Ds1 or Ds2 is located in the position which is distant from the target parking position Pa in the direction X by a predetermined distance x2 (>x1), the predetermined distance x2 being determined by the above restriction.

Moreover, the running path of the self-vehicle to the target parking position Pa is restricted by the above restrictions as the position of the self-vehicle in the direction of movement of the self-vehicle is becoming far from the target parking position Pa. The boundary line ($\alpha 2$-$\alpha 3$) in the direction Z of the parking start permissible region Ds1 is located in the position which is distant from the target parking position Pa in the direction Z by a predetermined distance z2, the predetermined distance z2 being determined by the above restriction. The boundary line ($\alpha 2$-$\alpha 5$) in the direction Z of the parking start permissible region Ds2 is set to a boundary line which passes through the point $\alpha 2$ which is distant from the target parking position Pa in the direction X by the predetermined distance x1 and distant from the target parking position Pa in the direction Z by the predetermined distance z2, the distance in the direction Z of the boundary line from the target parking position Pa increasing as the distance in the direction X of the boundary line from the target parking position Pa increases.

Moreover, the running path of the self-vehicle to the target parking position Pa is restricted by the above restrictions as the position of the self-vehicle in the direction of movement of the self-vehicle is becoming close to the target parking position Pa. The boundary line ($\alpha 1$-$\alpha 4$) in the direction Z of the parking start permissible region Ds1 or Ds2 is set to a straight line A which passes through the point $\alpha 1$ which is distant from the target parking position Pa in the direction X by the predetermined distance x1 and distant from the target parking position Pa in the direction Z by the predetermined distance z1, the distance in the direction Z of the straight line A from the target parking position Pa increasing as the distance in the direction X of the straight line A from the target parking position Pa increases. Namely, as the distance in the direction X between the self-vehicle and the target parking position Pa increases, the restrictions, including the image capturing range of the back monitor camera 20, the geometrical dimensions and turning characteristics of the self-vehicle, etc., have a lot of influence. The parking of the self-vehicle to the target parking position Pa will become impossible if the location of the end point in the direction Z of the parking initial position from which the parking of the self-vehicle to the target parking position Pa is permissible is not sufficiently distant from the target parking position Pa. Even if the backward parking of the self-vehicle is started from a position which is nearer to the target parking position Pa than the straight line A, the self-vehicle cannot reach the target parking position Pa appropriately.

Assuming that $\beta$ denotes an angle-of-field guard angle and lrc denotes a distance between the self-vehicle rear end and the back monitor camera 20 (distance between the vehicle rear end and the camera) (refer to FIG. 9), the equation of the straight line A in the X-Z coordinate system in which the origin is placed at the target parking position Pa is represented by the formula: $Z=\tan(\beta)\times||X|-HW|+OHr+lrc+lmin+lformargin+OHr$.

Therefore, the parking initial position computing part 48 uses the results of computation including the minimum parking lot length lmin computed based on the known vehicle information, such as the geometrical dimensions and turning characteristics of the self-vehicle, as well as the X coordinate of the current position of the self-vehicle (or the distance x in the direction X from the target parking position Pa to the current position of the self-vehicle), and determines the Z coordinate of the current position of the self-vehicle nearest to the parking initial position (or the distance z in the direction Z from the target parking position Pa to the parking initial position) in accordance with the above-mentioned equation of the straight line A.

Namely, the parking initial position computing part 48 can determine the coordinates of the current position of the self-vehicle nearest to the parking initial position based on the distance between the target parking position Pa and the self-vehicle in the vehicle width direction of the self-vehicle, from among different parking initial positions (the parking start permissible regions Ds) which are appropriate as a parking starting position for starting the parking of the self-vehicle to the target parking position Pa.

Figure 9:
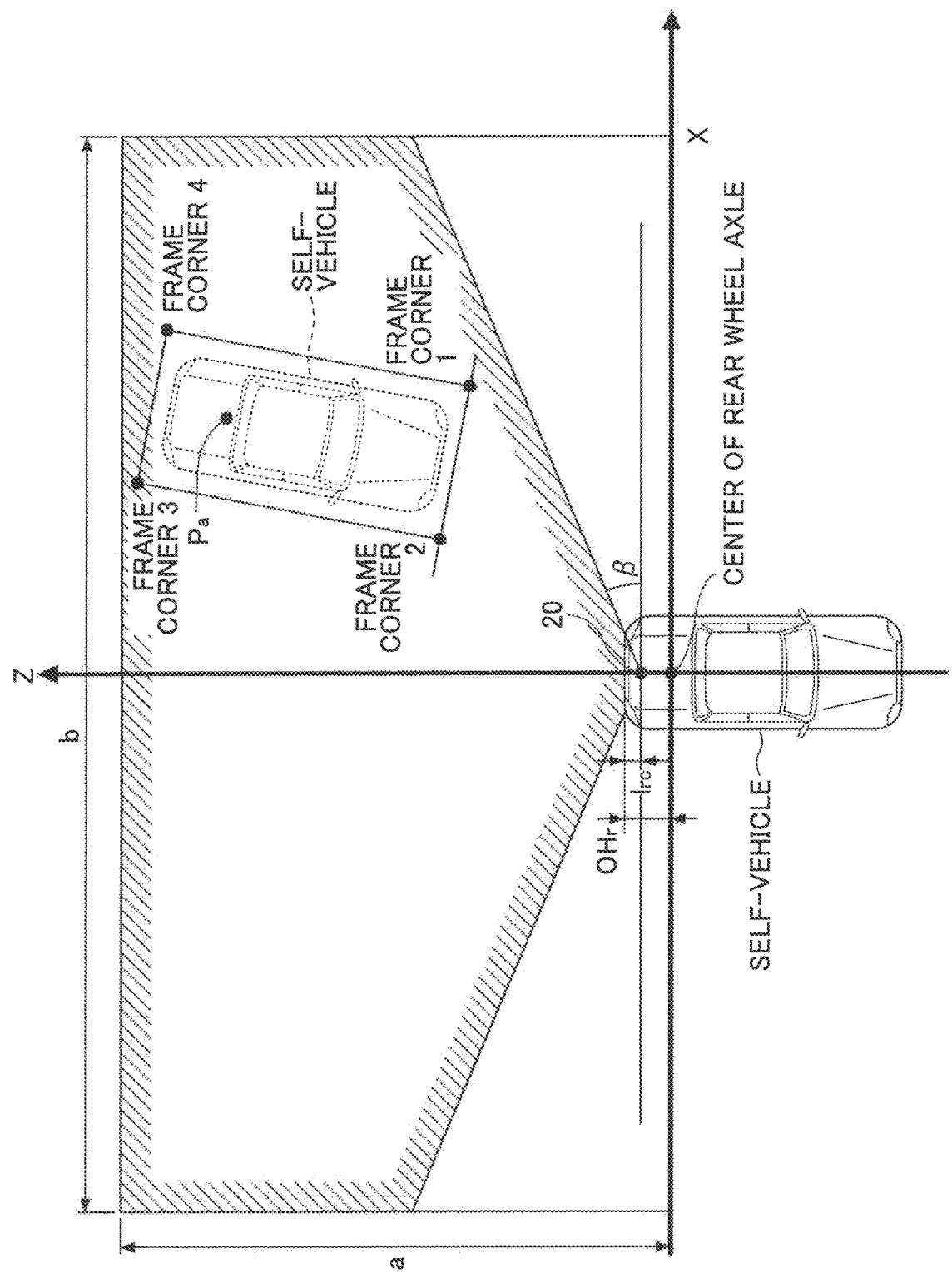
FIG. 9 is a diagram illustrating an angle of field of a back monitor camera 20.

FIG. 9 illustrates an angle of field of the back monitor camera 20. The angle of field (the image capturing range) of the back monitor camera 20 is indicated by the hatching area in FIG. 9. For example, the angle of field of the back monitor camera 20 may be indicated by a configuration of a pentagon which is defined by a distance "a" backward of the center of the rear wheel axle of the vehicle in the vehicle fore-and-aft direction and a width "b" of the pentagon in the vehicle width direction of the vehicle. Specifically, the distance "a" may be about 10 m and the width "b" may be about 20 m. The configuration and dimensions of the angle of field of the back monitor camera 20 may vary depending on the type of the vehicle, etc. This invention is not limited to the above-described example.

The angle-of-field guard angle $\beta$ is an angle between the rear wheel axle of the vehicle and the boundary line of the image capturing range of the back monitor camera 20 (or the boundary line of the angle of field) (which angle exists for each of the right and left sides of the vehicle). For example, if an end point of an obstacle Z, an end point of the parking frame, or a virtual pole (refer to FIG. 6) used as a substitute for these end points currently lies within the angle of field of the back monitor camera 20, the start of the parking assistance from the current initial parking position of the vehicle to the target parking position Pa is permitted. For example, in the case of parallel parking which is performed to the left backward of the vehicle, the condition for permitting the start of the parking assistance may be set to that the end points of the obstacle Z (or the frame corners 2, 3, 4 of the parking frame) lie within the angle of field of the back monitor camera 20.

When the self-vehicle arrives at the point of a predetermined distance Zr from the parking initial position which is determined by the parking initial position computing part 48 as described above, the information output control part 49 starts the parking assistance for guiding the self-vehicle to the parking initial position. For example, the information output control part 49 starts the parking assistance for guiding the self-vehicle to the parking start permissible region Ds when the distance in the direction X from the target parking position Pa to the current position of the self-vehicle is larger than or equal to the predetermined distance x1 and smaller than or equal to the predetermined distance x2 and the distance in the direction Z from the current position of the self-vehicle to the parking initial position nearest to the current position of the self-vehicle is smaller than or equal to the predetermined distance Zr.

The above parking assistance may include the outputting of a message (such as a guidance message for guiding the self-vehicle to the parking start permissible region Ds) to the vehicle operator by voice and/or by display information, and the steering assistance for assisting the vehicle operator to cause the self-vehicle to move appropriately to the parking start permissible region Ds. Specifically, the parking assistance performed by the information output control part 49 for guiding the self-vehicle to the parking start permissible region Ds may be the outputting of a voice message which requests stopping of the vehicle (such as "please stop the vehicle slowly while keeping a going-straight state"), and/or the performance of automatic intervention braking or automatic intervention steering. In this manner, the parking assistance is started before the self-vehicle reaches the parking start permissible region Ds, and the self-vehicle can be appropriately guided to the parking start permissible region Ds and can be stopped in the region.

If the parking initial position lies in the parking start permissible region Ds, the parking assistance for guiding the self-vehicle to the parking start permissible region Ds may be performed to guide the self-vehicle to the parking initial position whose X coordinate is the same as the X coordinate of the current position of the self-vehicle, or to guide the self-vehicle to the parking initial position whose X coordinate is different from the X coordinate of the current position of the self-vehicle.

Figure 10:
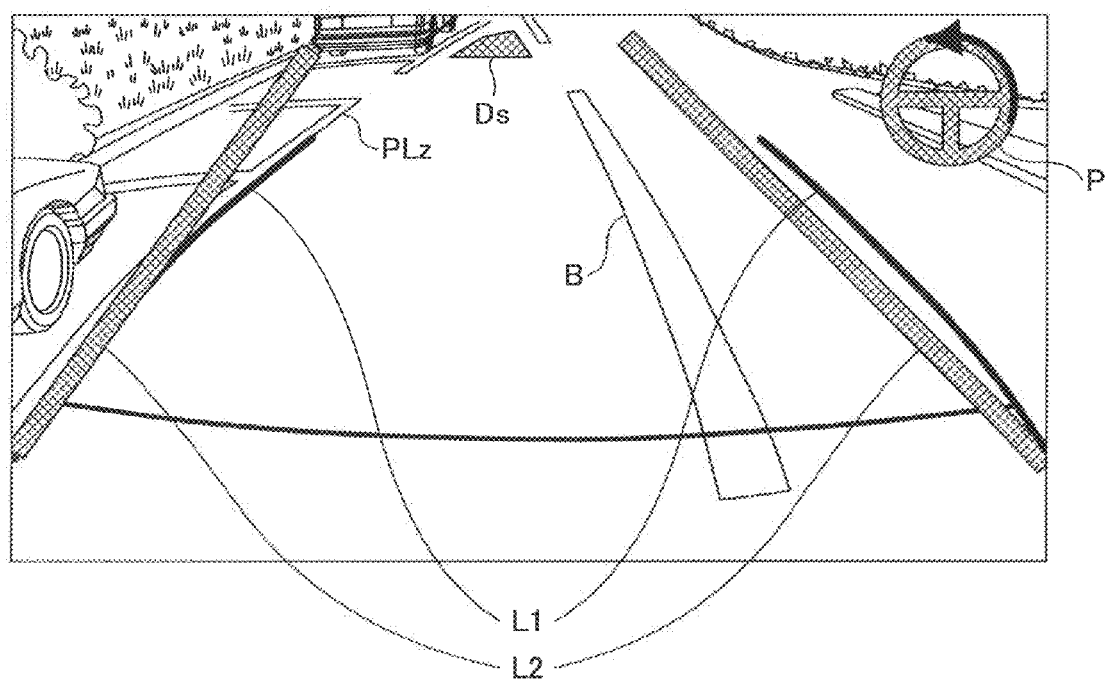
FIG. 10 is a diagram illustrating a state in which an image taken by a front monitor camera 21 is displayed on a display 22.

As illustrated in FIG. 10, the information output control part 49 is arranged to display the image of the parking start permissible region Ds including the parking initial position on a display 22 (refer to FIG. 1) which is capable of outputting of display information to the vehicle operator, when the self-vehicle arrives at the point of the predetermined distance Zr from the parking initial position determined by the parking initial position computing part 48.

FIG. 10 is a diagram illustrating a state in which an image captured by the front monitor camera 21 is displayed on the display 22. In FIG. 10, the parking frame line PLz of the parking frame where the self-vehicle is finally parked and the white line B for dividing the lanes are included in the captured image.

The information output control part 49 is arranged to superimpose the image of the parking start permissible region Ds determined by the parking initial position computing part 48, on the captured image. Thereby, the vehicle operator can recognize easily the position where the self-vehicle is to be stopped, when performing the parallel parking to the parking frame in which the self-vehicle is to be finally parked.

At this time, the information output control part 49 may be arranged to superimpose, on the captured image, the reference line indicators L1 (which extend along the direction parallel to the straight line or the parking frame line approximating the side part of the parked vehicle) as well as the line indicators L2 (which indicate the current direction of the self-vehicle) as illustrated in FIG. 10. Thereby, the vehicle operator can easily recognize that the steering operation is to be performed so as to match the line indicators L2 with the reference line indicators L1.

Moreover, the information output control part 49 may be arranged to superimpose the guidance indicator P (which diagrammatically indicates the steering direction needed to match the line indicators L2 with the reference line indicators L1) on the captured image as illustrated in FIG. 10. Thereby, the vehicle operator can recognize the steering direction of the steering wheel intuitively. Moreover, another indicator indicating the amount of steering needed to match the line indicators L2 with the reference line indicators L1 or another useful information may be superimposed on the captured image similarly.

The predetermined distance Zr described above may be changed in accordance with the current vehicle speed of the self-vehicle. For example, the predetermined distance Zr when the current vehicle speed is 5 km/h is set to 1 m, the predetermined distance Zr when the current vehicle speed is 10 km/h is set to 1.5 m, and the predetermined distance Zr for an intermediate vehicle speed is determined by linear interpolation between them. By this example, the predetermined distance Zr can be changed linearly in accordance with the current vehicle speed of the self-vehicle. That is, before the self-vehicle reaches the parking start permissible region Ds, the parking assistance for guiding the self-vehicle to the parking start permissible region Ds can be started at a timing appropriately for the current vehicle speed of the self-vehicle.

Figure 11:
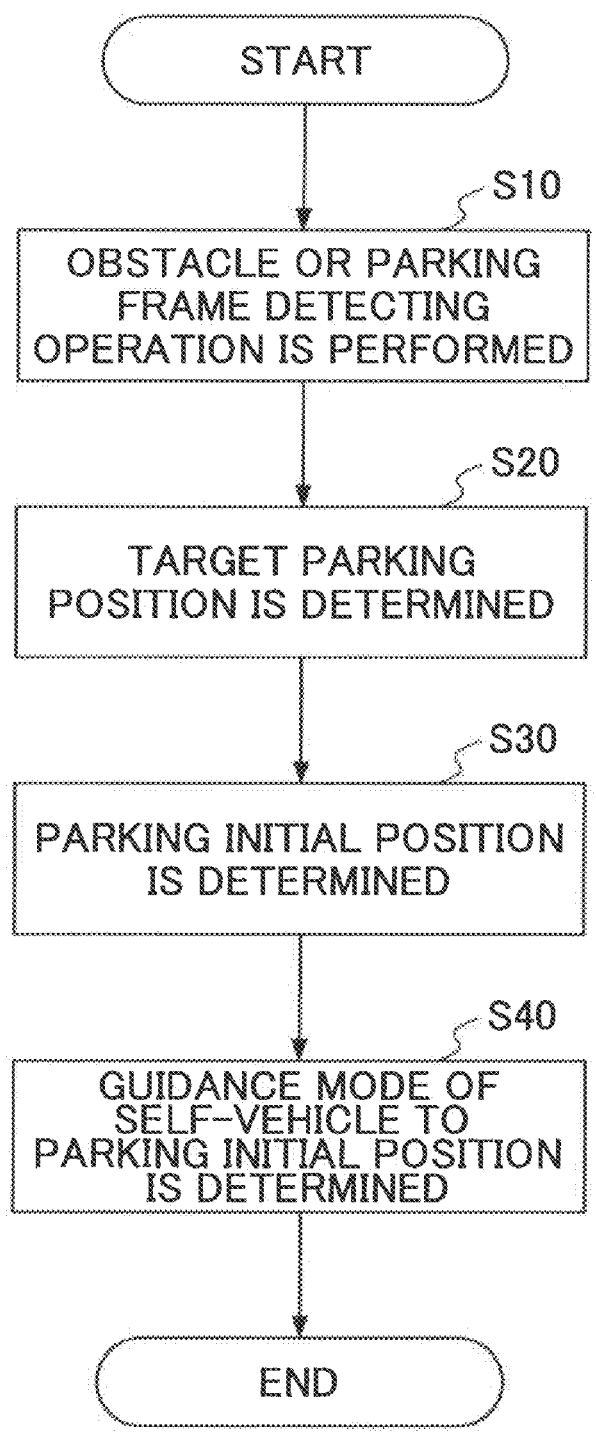
FIG. 11 is a flowchart for explaining the processing routine of a parking assisting control which is performed by the parking assisting ECU 12.

FIG. 11 is a flowchart for explaining the processing routine of a parking assisting control which is performed by the parking assisting ECU 12.

The processing routine illustrated in FIG. 11 may be started when the parking switch 52 is turned ON and the parallel parking mode is designated.

The obstacle information generating part 42 performs the above-described obstacle detecting operation, and/or the parking frame information generating part 44 performs the above-described parking frame detecting operation (step S10).

The target parking position determining part 46 determines a target parking position based on the obstacle information generated by the obstacle information generating part 42 and/or the parking frame information generated by the parking frame information generating part 44, by using the results of computation, such as the minimum parking lot length lmin as described above (step S20).

The parking initial position computing part 48 determines a parking start permissible region Ds (parking initial position) based on the target parking position determined by the target parking position determining part 46 as described above (step S30).

The information output control part 49 determines the guidance mode of the self-vehicle to the parking start permissible region Ds before the self-vehicle reaches the parking start permissible region Ds determined by the parking initial position computing part 48 (step S40). Guidance of the self-vehicle to the parking start permissible region Ds is started in the determined guidance mode by the information output control part 49.

In the above-described embodiment, the parking initial position from which parking of the self-vehicle to the target parking position Pa is permissible varies depending on the distance between the target parking position Pa and the self-vehicle in the vehicle width direction of the self-vehicle, and so the guidance mode of the self-vehicle to the parking initial position is determined based on the above-mentioned distance. Therefore, the self-vehicle can be appropriately guided to the parking initial position from which parking of the self-vehicle to the target parking position Pa is permissible. Namely, the boundary position of the parking start permissible region Ds containing the parking initial position from which parking of the self-vehicle to the target parking position Pa is permissible varies depending on the above-mentioned distance as illustrated by the straight line A in FIG. 8. Thus, if the guidance mode of the self-vehicle to the parking initial position is determined based on the above-mentioned distance, guidance of the self-vehicle to the parking initial position can be performed appropriately.

As is apparent from the gradient of the straight line A (the boundary line ($\alpha1$-$\alpha4$)) or the boundary line ($\alpha2$-$\alpha5$) in FIG. 8, the distance between the target parking position Pa and the parking initial position from which parking of the self-vehicle to the target parking position Pa is permissible decreases as the distance between the target parking position Pa and the self-vehicle in the vehicle width direction of the self-vehicle decreases.

Therefore, in the above-described embodiment, the start timing of the parking assistance for guiding the self-vehicle to the parking start permissible region Ds is set up based on the parking initial position on the straight line A which is the boundary line of the parking start permissible region Ds nearest to the self-vehicle, and the parking assistance (message outputting, automatic running, etc.) can be performed, before the self-vehicle reaches the parking start permissible region Ds, in the appropriate start timing in accordance with the distance between the self-vehicle and the target parking position Pa in the vehicle width direction of the self-vehicle.

For example, the timing to start the parking assistance when the distance between the target parking position Pa and the self-vehicle in the vehicle width direction of the self-vehicle is small is set up as being earlier than that in the case in which the distance is large, even if the distance between the target parking position Pa and the current position of the self-vehicle in the direction of movement of the self-vehicle is the same. Therefore, it is possible to make the timing of starting of the parking assistance appropriate for the parking initial position with which the distance between the target parking position Pa and the parking initial position decreases as the distance between the target parking position Pa and the self-vehicle in the vehicle width direction of the self-vehicle decreases.

In the above-described embodiment, the stopping guidance is performed before the self-vehicle reaches the parking start permissible region Ds, and it is not after the self-vehicle enters the parking start permissible region Ds. Thus, even if the vehicle operator has a free running period between a time the stopping guidance is supplied to the vehicle operator and a time the braking operation is started by the vehicle operator, or has a certain braking period between a time the braking operation is started and a time the self-vehicle is stopped, the self-vehicle can be stopped appropriately in the position within the parking start permissible region Ds so as not to exceed the parking start permissible region Ds.

In the above-described embodiment, the target parking position and the parking initial position from which parking of the vehicle to the target parking position is permissible are determined by taking into consideration the geometrical dimensions and turning characteristics of the self-vehicle. Thus, it is possible guide the self-vehicle to the parking initial position and stop the self-vehicle in the position where the self-vehicle does not collide with the obstacle T.

Although the embodiments of the invention have been described in detail, it should be understood that the various modifications, substitutions, and alterations may be made without departing from the scope of the invention.

In the above-described embodiments, it is assumed for the purpose of description that the obstacle is a parked vehicle. However, any of tangible things, such as a bicycle, a two-wheel barrow, a wall, and two or more pylons, may be considered obstacles.

In the above-described embodiments, the information about the position of a vehicle is acquired and determined by using the speed sensor 18 and the steering angle sensor 16. Alternatively, the speed sensor 18 and the steering angle sensor 16 may be replaced with or used together with a yaw rate sensor, a gyro sensor, a direction meter, a GPS positioning result, etc.

The assisting operation by the guiding unit of the parking assisting device including the parking assisting ECU 12, the display 22, a speaker 24 and a steering control ECU 30 may include message assistance, steering assistance, etc. which are aimed at guiding the vehicle appropriately to the parking initial position. The steering assistance may include automatic running assistance.

The automatic running assistance is not necessarily limited to only a case in which all the running operations are performed by automatic control. The automatic running assistance may cover a semi-automatic control case in which some of the required running operations are performed by automatic control and others are not performed automatically. For example, a semi-automatic control in which vehicle speed control is manually performed by the vehicle operator and steering control is performed by automatic control, and a semi-automatic control in which vehicle speed control is performed by automatic control and steering control is manually performed by the vehicle operator may be covered by the automatic running assistance.

The message assistance is not necessarily limited to only a case in which the message is supplied to the vehicle operator by voice or by display. The message assistance may cover a case in which steering power is compulsorily applied to the steering wheel for a short time, and a case in which a vibrating device provided in the steering column or the seat is actuated.

This international application is based upon and claims the benefit of priority of Japanese patent application No. 2007-035457, filed on Feb. 15, 2007, the contents of which are incorporated by reference in their entirety.

The invention claimed is:

1. A parking assisting device, comprising:
an ambient area detecting unit that detects an obstacle or a parking frame in an ambient area surrounding a vehicle; and
a guiding unit that guides the vehicle to a parking initial position after a parking space is detected and the parking initial position is determined, the parking initial position being a starting position at which a running path to the parking space is generated and from which parking of the vehicle in the parking space commences, and the parking space being adjacent to a detected obstacle or a detected parking frame,
wherein a guidance mode of the guiding unit, in which the guiding unit guides the vehicle to the parking initial position, is based on a distance between the vehicle and the detected obstacle or the detected parking frame, the distance being measured in a vehicle width direction of the vehicle, where the vehicle width direction is a direction transverse to a running direction of the vehicle extending from a side of the vehicle, and
wherein an amount of movement of the vehicle to the parking initial position varies depending on the distance measured in the vehicle width direction.

2. The parking assisting device according to claim 1, wherein the guiding unit includes a message unit that informs a vehicle operator of the parking initial position in an audio-visual manner, and
wherein a start timing of information by the message unit is adjustable according to the distance.

3. The parking assisting device according to claim 2, wherein a first start timing of information by the message unit, which is set when the distance is equal to a first value, is earlier than a second start timing of information by the message unit, which is set when the distance is equal to a second value, if the first value is smaller than the second value.

4. The parking assisting device according to claim 1, wherein the guiding unit includes an automatic running unit that allows the vehicle to automatically run to the parking initial position, and wherein a start timing of automatic running by the automatic running unit is adjustable according to the distance.

5. The parking assisting device according to claim 4, wherein a first start timing of automatic running by the automatic running unit, which is set when the distance is equal to a first value, is earlier than a second start timing of automatic running by the automatic running unit, which is set when the distance is equal to a second value, if the first value is smaller than the second value.

6. A parking assisting method, comprising:
- detecting an obstacle or a parking frame in an ambient area surrounding a vehicle;
- determining a target parking position of the vehicle based on the detected obstacle or the detected parking frame;
- determining a parking initial position, which is a starting position at which a running path to the parking space is generated and from which parking of the vehicle in a determined target parking position commences after the target parking space and the parking initial position are determined, based on a distance between the vehicle and the detected obstacle or the detected parking frame, the distance being measured in a vehicle width direction of the vehicle, where the vehicle width direction is a direction transverse to a running direction of the vehicle extending from a side of the vehicle; and
- setting a guidance mode, in which the vehicle is guided to the parking initial position, based on a determined parking initial position,
- wherein an amount of movement of the vehicle to the parking initial position varies depending on the distance measured in the vehicle width direction.

7. The parking assisting method according to claim 6, wherein the step of setting the guidance mode includes setting a start timing at which guiding of the vehicle to the parking initial position is started.

8. The parking assisting device according to claim 1, wherein the parking initial position is a range of space, within which the vehicle is guided to.

9. The parking assisting method according to claim 6, wherein the parking initial position is a range of space, within which the vehicle is guided to.

* * * * *